March 10, 1964 S. STOKLAND 3,124,139
APPARATUS FOR THRESHING GRAIN
Filed Nov. 1, 1960 4 Sheets-Sheet 1
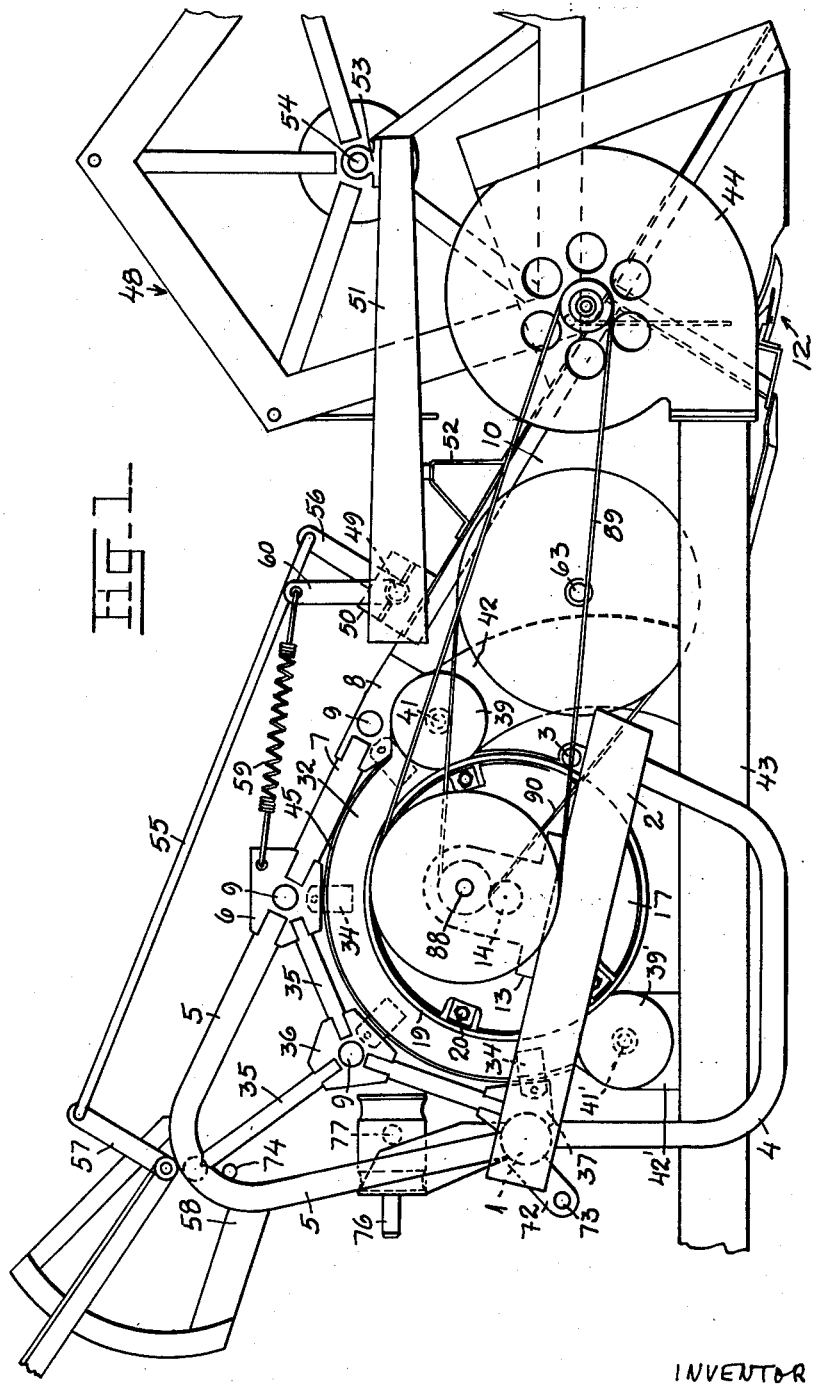
INVENTOR
SIGMUND STOKLAND
BY *[signature]*
AGENT

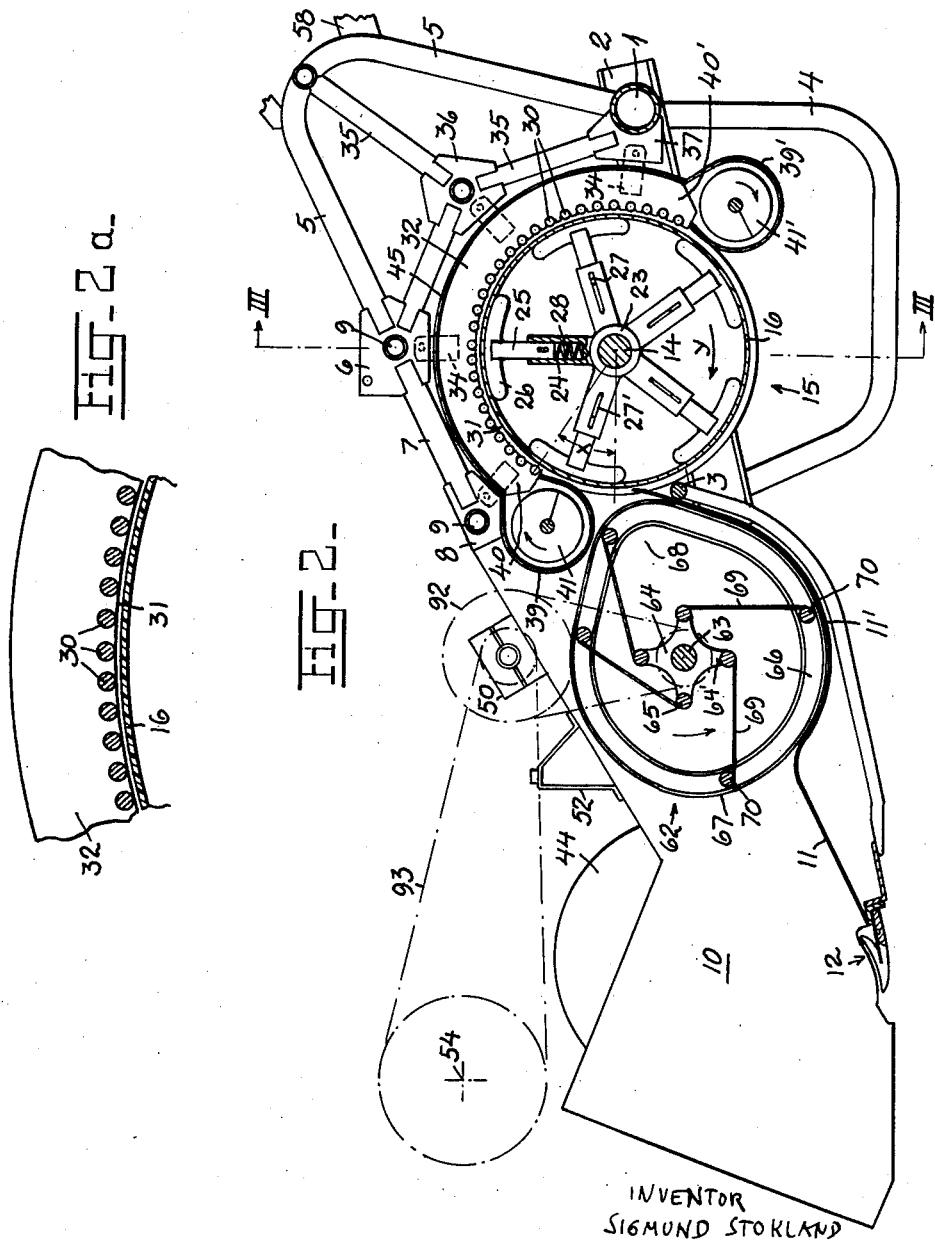

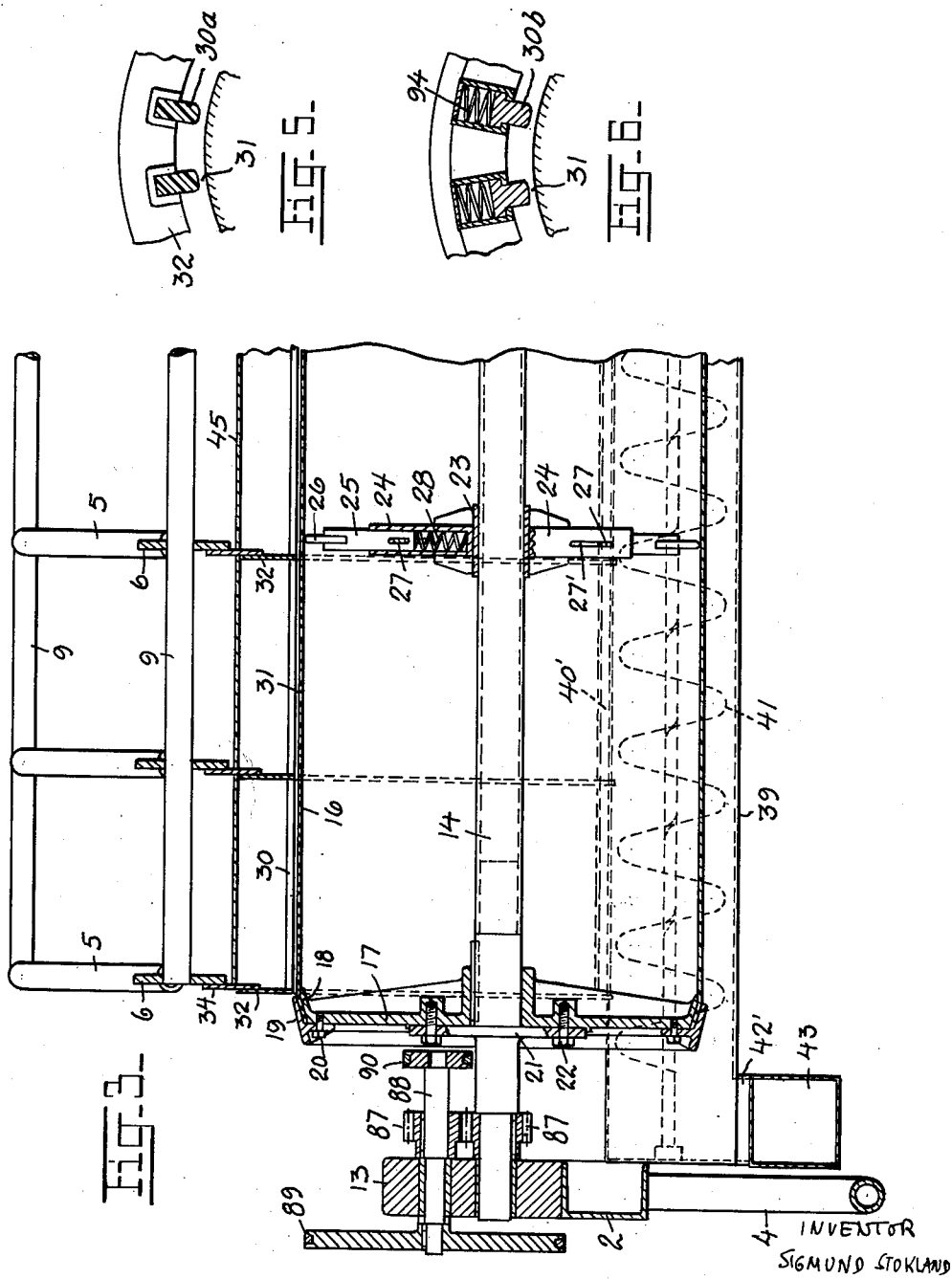

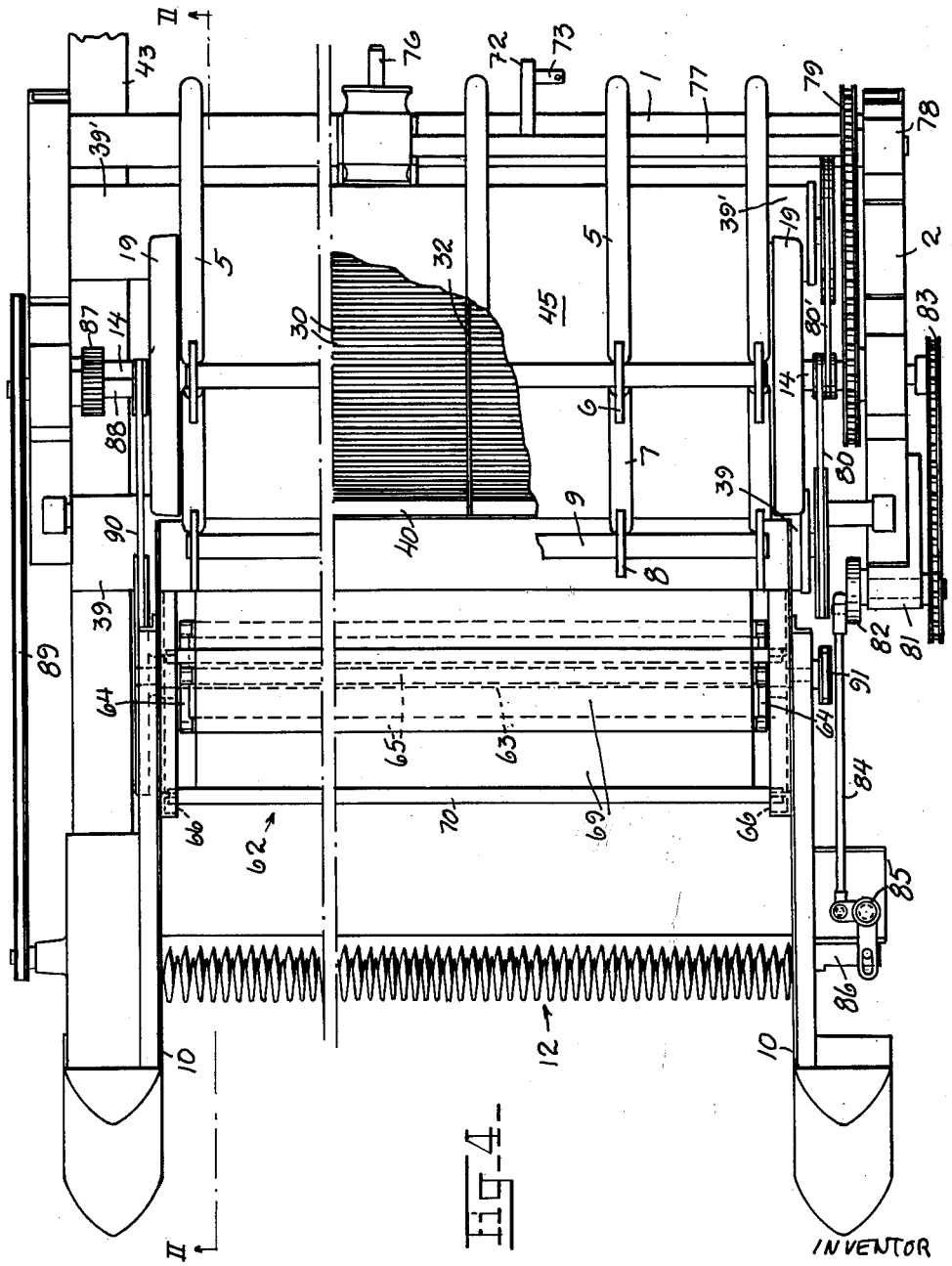

United States Patent Office 3,124,139
Patented Mar. 10, 1964

3,124,139
APPARATUS FOR THRESHING GRAIN
Sigmund Stokland, Nygaards Alle 3, Oslo, Norway
Filed Nov. 1, 1960, Ser. No. 66,468
Claims priority, application Norway Nov. 7, 1959
8 Claims. (Cl. 130—27)

The present invention relates to apparatus for threshing grain.

An object of the present invention is to provide a threshing apparatus which has a simple and compact structure so that when incorporated in an agricultural engine, such as a harvester, it allows a considerable reduction in the overall dimension and weight thereof. The harvester may thus be formed without a special propelling motor but may be connected to the hitch link mechanism and the power take-off shaft of a tractor so as to be propelled and operated by means thereof.

According to the present invention there is provided apparatus for threshing grain, wherein the cylindrical surface of a rotatable drum or roller cooperates with the adjacent surface of each of a plurality of counter-pressure members disposed around a substantial part of the periphery of said cylindrical surface, said counter-pressure members being spaced circumferentially of said drum or roller and extending axially thereof, said cylindrical surface and adjacent surfaces being elastically yieldable relative to one another radially of said drum or roller, threshing being effected by rotating said drum whereby the relative movement between said drum or roller and the counter-pressure members causes the grain to be rubbed between said cylindrical and said adjacent surfaces whereby the grain is rubbed from the ears.

For a better understanding of the invention and to show how the same may be carried into effect, reference will now be made, by way of example, to the accompanying drawings, in which:

FIGURE 1 is a side elevation of a harvester,

FIGURE 2 is a section taken on the line II—II in FIGURE 4, parts of the harvester being broken away, FIGURE 2a shows in enlarged detail a part of the harvester of FIGURE 1, FIGURE 3 is a section taken on the line III—III in FIGURE 2, parts of the harvester being broken away, FIGURE 4 is a plan view of the harvester of FIGURE 1, certain parts having been removed to reveal others, FIGURES 5 and 6 show on a larger scale modified forms of counter-pressure members for the harvester illustrated in FIGS. 1 to 4.

The harvester shown comprises a transverse support member 1 to each end of which is secured a channel iron 2 extending from the member 1 towards the forward end of the harvester. The irons 2 are interconnected at their forward ends by a transverse brace 3. At its lower side each of the irons 2 is provided with a runner-shaped hoop 4 supporting the iron on the ground in the forwardly inclined position as shown in FIGURE 1.

A number of laterally spaced tubular hoops 5 each having one end secured to the support member 1, extend upwardly and forwardly of the member 1 and the free end of each hoop is connected by way of a vertically positioned plate 6 with one end of an extension tube 7. The other end of each tube 7 is provided with a similar plate 8. The plates 6 and 8 are secured, such as by welding, in corresponding axial slits in the respective ends of the tubes 5 and 7. The rows of plates 6 and 8 are secured one to each of two transverse braces 9 passing through openings therein. Adjacent the two outermost plates 8 and fixedly secured in relation thereto are mounted forwardly directed side walls 10, a bottom 11 connecting the end walls 10 and bottom 11 form a conventional harvester table. Along the forward edge of the bottom 11 is operatively secured a conventional crop cutting mechanism 12.

In bearings 13, secured on the channel irons 2, is rotatably supported a transverse shaft 14 of a rubbing drum or roller 15 which is positioned below the overhanging parts of the hoops 5. The drum or roller 15 has a cylindrical shell 16 which extends across the width of the harvester. The shell 16 has a relatively small wall thickness and consists of a resilient, yielding material, such as rubber, preferably reinforced by suitable fibre materials or the like embedded therein.

Each end of the shell 16 is closed by means of an end piece 17 carried by the shaft 14, the pieces 17 being fast in rotation with the shaft 14 but free to move axially along the shaft 14. Each end piece 17 is provided with an outwardly tapering, circumferential surface 18 against which the rim portion of the shell 16 is clamped by means of a clamping ring 19 secured by means of screws 20.

On the shaft 14, at the outer side of each end piece 17, is secured a disc or flange 21 having a number of circumferentially spaced bores receiving screws 22 threaded into the end piece 17. Although both end pieces 17 may be mounted so as to be displaceable along the shaft 14 it is possible to arrange one end piece 17 fixed on the shaft while the other remains displaceable.

During mounting of the shell 16 the ends thereof are clamped to the end pieces 17 as described above. The length of shell 16 which is between the end pieces is chosen as less than the distance by which the flanges 21 are spaced apart along the shaft. By subsequent insertion and tightening of the screws 22 the end piece, or pieces, 17 is or are drawn against and secured to the adjacent flange 21 and thereby the shell 16 is pre-stressed to the required degree.

In order to retain the exact cylindrical shape of the shell 16 the drum or roller 15 may be made air-tight so that the shell may be filled with a gas, such as air, under pressure.

To this end it is, however, satisfactory to secure on the shaft 14 a number of spiders 23 (see FIGURE 2) suitably spaced in the axial direction of the shell 16. Each of the spiders is provided with five radially directed tubular arms 24 each of which has inserted therein a rod 25 displaceable axially of the associated arm 24. Each rod 25 carries on its outer end a plate-like head 26 extending transversely of the axis of the drum 15, the outer surface of each head 26 being curved in conformity with the curvature of the inner surface of the shell 16. The rod 25 is prevented from rotating in the arm 24 by means of a pin and slot connection 27, 27' which also limits the movement of the rod radially outwardly to the position in which the head 26 is in engagement with the wall of the shell 16. Springs 28 are located in the arms 24 to force the rods 25 towards their radially outer positions. As, however, the drum or roller 15, in operation, rotates with a speed of about 700 r.p.m. the rods 25 are moved radially outwards by the centrifugal force so that the springs 28 may be dispensed with if so desired.

As shown the harvester includes counter-pressure members in the form of rods 30 which for the sake of convenience are of equal diameter. The rods 30, which are circular in cross-section, extend longitudinally of the shell 16 and are evenly spaced around a substantial part of the circumference thereof. The rods 30 are spaced radially from the surface of the shell at such a distance as to form a space 31 between the outer surface of the shell and the rods 30. The width of the space 31 is chosen in dependence on the kind of grain to be treated thereby to avoid crushing or other damage to the grain itself.

The rods 30 are fixed in correct relative positions in a set of arcuate plates 32. The plates 32 are spaced axially along the drum 16 and have an inner radius equal to the radial distance of the rods 30 from the axis of the shell 16. The plates 32 are provided with openings in which the rods are inserted and secured, such as by welding. Thus an assembly is provided forming an approximately semi-circular bridge-like structure which hereinafter also will be indicated as "the bridge."

The bridge is secured in the frame of the harvester in such a position above the shell 16 that a radial plane through the first rod 30 of the set (taken in the direction of rotation of the roller indicated by arrow y in FIGURE 2), forms an angle x with the horizontal plane through the longitudinal axis of the drum 15. The angle x is of approximately 45° and the last rod 30 of the set is on the diametrically opposed side of the drum 15.

The bridge is fixed in position by means of radially extending straps 34 carried by the plates 32, the straps 34 being secured, such as by welding or screws, to the plates 6 and 8 and also to similar plates 36 and 37. The plate 36 is secured in the hoops 5 by means of braces 35 and the plate 37 is secured to the transverse support member 1.

At the front edge of the bridge adjacent the first rod 30 a gutter 39 extends transversely of the harvester and parallel to the axis of the drum 15. The gutter 39 has a substantially circular cross-section with an opening 40 directed towards the one end edge of the bridge and through which opening 40 released grain and chaff flowing out between the rods 30 of the bridge fall into the gutter 39. A similar gutter 39' is arranged at the opposite edge of the bridge and has its opening 40' directed upwardly so that grain and chaff released at this side of the drum 15 fall into the gutter 39'.

In the gutters 39, 39' rotatably journalled screws 41 and 41', are respectively arranged, by means of which screws grain and chaff entering the gutters are conveyed to the ends thereof at one side of the harvester (FIGURE 1). At this side of the harvester the gutters 39 and 39' communicate, by means of tubes 42, 42' respectively, with a horizontally positioned collecting pipe 43 the front end of which is connected to the output side of a fan 44. The fan 44 is secured to the adjacent side wall 10 and blows grain and chaff through the pipe 43 to a cyclone or similar separator (not shown) mounted on the tractor (not shown) and from which clean grain is filled into suitable transport containers.

In order to collect and convey the grain flowing out between the rods 30 to the gutters 40, 40' the bridge on its upper side is covered by a screen 45. The screen 45 preferably rests on the plates 32 with its front and rear edges engaging the outer edges of the gutter openings 40 and 40' respectively.

A front-mounted rotary reel 48 of conventional type is provided to deflect the standing crop toward the crop cutting mechanism 12, as shown in FIGURE 1.

A transverse shaft 49 is rotatably mounted in bearings 50 secured on the upper edges of the side walls 10. To the ends of the shaft 49 are fixedly secured forwardly extending levers 51 which in the working position rest on brackets 52 mounted on the side walls 10 in front of the bearings 50. At their free ends the levers 51 are provided with bearings 53 in which the reel shaft 54 is rotatably mounted.

Means are provided to adjust the position of the reel 48 vertically. The adjusting means comprises a connecting rod 55 one end of which is secured in an aperture in a lever 56 and the other end of which is secured to a control lever 57 associated with a quadrant 58 secured to one of the frame hoops 5. The lever 56 is secured to the shaft 49. The lever 57 is adjustable with respect to the quadrant 58 and may be secured in different positions by means of conventional teeth and ratchet means (not shown). The arrangement is such that as the control lever 57 is moved downwards or upwards the levers 51 are pivoted about the axis of the shaft 49 thereby raising or lowering the reel 48.

The weight of the reel 48 is counterbalanced by tension springs 59 connected between lugs 60 on the shaft 49 and the plates 6.

A feeding mechanism 62 to convey cut crop from the cutting mechanism 12 to the threshing part of the harvester is mounted in front of the threshing drum 15. The feeding mechanism 62 comprises a transverse shaft 63 rotatably supported in the side walls 10 and carrying adjacent each of said walls 10 a spider 64 having four arms 64'. Between each arm 64' of one of the spiders 64 and a corresponding arm 64' of the other spider 64 is rotatably mounted a shaft 65. A cam groove 66 is arranged around the axis of the shaft 63 on each side wall 10. The cam groove 66 comprises a substantially semi-circular part 67 with a somewhat extended part 68 directed towards the space between the gutter 39 and the roller shell 16, as shown in FIGURE 2. To each of the shafts 65 is secured one edge of a corresponding plane plate 69 and to the opposite edge of each of the plates 69 is secured a rod 70. Each rod 70 has such a length that each end thereof is received in the associated cam groove 66. The cam grooves 66 are positioned somewhat eccentrically with respect to the shaft 63 so that when the shaft 63 is rotated counter-clockwise (FIGURE 2) the plates 69, which act as shovels, are imparted a circular motion in such manner that they convey cut crop from the cutting mechanism 12 along the plane sloping part of the bottom 11 and a concave part 11' extending parallel to the lower part of the cam groove 67, to contact with the roller shell 16 adjacent the gutter 39 so that said cut crop is passed into the space 31 between the rods 30 and the shell 16.

The frame of the harvester is adapted to be connected to a tractor and to that end the transverse support member 1 is provided with arms 72 carrying studs 73 for hydraulically operated hitch links. One of the hoops 5 carries a stud 74 for the top link of a conventional tractor.

The operation of the different movable parts of the apparatus take place from the power take-off of a tractor which, by a usual connection (not shown), drives a shaft 76 of a gear box, secured on the transverse support member 1. The shaft 76 imparts rotation by means of conical gears in the gear box to shaft 77 the outer end of which is mounted in a bearing 78 on the channel iron 2. The shaft 77 drives the shaft 14 by means of a chain 79. The transport screws 41, 41' of the gutters 39, 39' are driven from the shaft 14 by means of belt drives 80, 80' respectively. At the front end of the irons 2 is secured a bracket 81 in which is rotatably journalled a crank shaft 82 driven from the roller shaft 14 by means of a chain 83. The crank shaft 82 is connected by a rod 84 to an angle lever 85 operating the knife 86 of the crop cutting mechanism 12 in conventional manner.

At the opposite side of the frame of the harvester the roller shaft 14, by means of spur wheels 87 (FIGURE 4), is operatively connected to a shaft 88 rotatably supported in the pedestal of the bearing 13. The shaft 88 is connected to the fan 44 through a belt drive 89 and with the shaft 63 of the feeding device 62 through a belt drive 90.

The reel 48, which for the sake of clearness is only shown in FIGURE 1, is operated from a belt pulley 91 (FIGURE 4) on the shaft 63 through belt drives 92 and 93 as indicated with dot and dash lines in FIGURE 2.

When the harvester is propelled through a corn field connected to a tractor as described above the harvester operates in the following manner:

Cut crop from the cutting mechanism 12 is passed to the feeding device 62, the plates 69 of which convey the crop along the bottom portion 11' and upwardly into the space 31 between the surface of the rotating shell 16 and the stationary rods 30. The ears are rubbed against the shell 16 and rods 30 so that the grains are released and thrown out through the interstices between the rods 30. The straw leaves the space 3 at the last rod 30 and falls to the ground.

The grain and chaff ejected through the interstices between the members 30 are collected in the gutters 39, 39' and conveyed by the screws 40, 40' to the tube line 43 through which grain and chaff are blown to a suitable separator which may be positioned on the tractor.

Due to the elasticity of the roller shell 16, foreign matter, such as stones or the like, may pass through the apparatus without effecting any damage to the structure thereof.

In modified constructional forms of harvester the counter-pressure members 30a, as shown in FIGURE 5, may consist of elastic material, or as shown in FIGURE 6 the members 30b may be mounted radially movable against the action of spring means 94. In both cases the members 30a and 30b co-operate with a resilient cylindrical roller surface.

I claim:

1. In a threshing machine, the combination of a rotatable drum having a pair of ends and a lateral wall formed from resiliently yieldable material, tensioning means axially tensioning said wall, and a stationary concave disposed adjacent said drum, said concave including a plurality of spaced parallel longitudinal members formed from rigid material, said longitudinal members having rounded longitudinal edges facing said lateral wall of said drum in closely spaced relation.

2. In a threshing machine, the combination of a rotatable drum having a pair of end walls with bevelled peripheral edges, a lateral wall of resiliently yieldable material having its end portions overlapping said bevelled edges, and tensioning means, said tensioning means including a pair of bevelled rings screw-threadedly secured to said end walls and adjustably clamping the end portions of said lateral wall against said bevelled edges in such a manner that said lateral wall is tensioned axially of the drum, and a stationary concave disposed adjacent said drum, said concave including a plurality of spaced parallel longitudinal members having rounded longitudinal edges, said longitudinal members being formed from rigid material and the rounded edges thereof facing said lateral wall of the drum in closely spaced relation.

3. In a threshing machine, the combination of a rotatable shaft, a drum mounted on said shaft for rotation therewith, said drum including a pair of end walls secured to the shaft, a lateral wall of resiliently yieldable material having its end portions mounted on peripheral edges of said end walls, and a set of radially expansible spiders provided at longitudinally spaced points on said shaft within said drum, said spiders supportably engaging said lateral wall, and a stationary concave disposed adjacent the lateral wall of the drum in closely spaced relation.

4. The combination as defined in claim 3 wherein each of said spiders includes a hub secured to said shaft, a set of radial guides secured to said hub, a set of arms slidable in said guides, and a set of shoes provided at the outer ends of said arms, said shoes supportably engaging the inner surface of said lateral wall upon outward sliding of said arms in said guides by centrifugal force when said drum is rotated.

5. The combination as defined in claim 4 wherein said shoes comprise arcuate segments disposed transversely to the axis of said shaft.

6. The combination as defined in claim 4 together with means provided in said guides and engaging said arms to limit the extent of outward sliding thereof.

7. The combination as defined in claim 4 together with resilient means provided in said guides and engaging said arms for urging the same outwardly.

8. In a threshing machine, the combination of a rotatable drum having a pair of end walls with bevelled peripheral edges, a lateral wall of resiliently yieldable material having its end portions overlapping said bevelled edges, and a pair of bevelled rings screw-threadedly secured to said end walls and adjustably clamping the end portions of said lateral wall against said bevelled edges whereby said lateral wall may be tensioned axially of the drum, a set of radially expansible spiders provided at longitudinally spaced points in said drum and supportably engaging the lateral wall thereof, and a stationary concave disposed adjacent said drum, said concave including a plurality of spaced parallel longitudinal members having rounded longitudinal edges, said longitudinal members being formed from rigid material and the rounded edges thereof facing said lateral wall of the drum in closely spaced relation.

References Cited in the file of this patent

UNITED STATES PATENTS

| | | |
|---|---|---|
| 1,427,000 | Lewinski | Aug. 22, 1922 |
| 2,369,745 | Millard et al. | Feb. 20, 1945 |
| 2,403,638 | Clark | July 9, 1946 |
| 2,755,912 | Ashton | July 24, 1956 |

FOREIGN PATENTS

| | | |
|---|---|---|
| 934,229 | France | May 14, 1948 |
| 13,065 | Great Britain | Apr. 30, 1850 |
| 858,984 | Great Britain | Jan. 18, 1961 |